United States Patent
Feijoo (10) Patent No.: US 11,549,833 B1
(45) Date of Patent: Jan. 10, 2023

(54) SYSTEM OF AND METHOD FOR MOUNTING AN ENVIRONMENTAL SENSOR TO AN ELEVATED SURFACE

(71) Applicant: Mount IT, LLC, Tarpon Springs, FL (US)

(72) Inventor: Roland Feijoo, Tarpon Springs, FL (US)

(73) Assignee: MOUNT IT, LLC, Tarpon Springs, FL (US)

( * ) Notice: Subject to any disclaimer, the term of this patent is extended or adjusted under 35 U.S.C. 154(b) by 0 days.

(21) Appl. No.: 17/837,644

(22) Filed: Jun. 10, 2022

(51) Int. Cl.
*G01D 11/30* (2006.01)

(52) U.S. Cl.
CPC .................. *G01D 11/305* (2013.01)

(58) Field of Classification Search
CPC ...................................... G01D 11/305
USPC ...................................... 248/222.52
See application file for complete search history.

(56) References Cited

U.S. PATENT DOCUMENTS

| | | | |
|---|---|---|---|
| 6,006,610 A * | 12/1999 | Lehnert | F02B 77/08 73/761 |
| 7,287,738 B2 | 10/2007 | Pitlor | |
| 8,915,361 B2 | 12/2014 | Rayner | |
| 9,354,158 B1 * | 5/2016 | van Dijk | G01K 7/02 |
| 9,819,910 B2 | 11/2017 | Huang et al. | |
| 11,066,004 B2 | 7/2021 | Schroeder et al. | |
| 2005/0253032 A1 | 11/2005 | Pitlor | |
| 2009/0153314 A1 * | 6/2009 | Young | G01D 11/305 340/459 |

* cited by examiner

*Primary Examiner* — Michael G Lee
*Assistant Examiner* — David Tardif
(74) *Attorney, Agent, or Firm* — Owen G. Behrens; Smith & Hopen, P.A.

(57) ABSTRACT

Described, herein, relates to a system of and method for the safe and rapid mounting of an environmental sensor (e.g., a smoke detector) onto an elevated support surface (e.g., a wall, a post, or a ceiling). Accordingly, the installation harness may include a housing and a wall mount. During use, the wall mount may be configured to be affixed to the elevated support surface. Additionally, the housing may be configured to selectively couple to the wall mount through a connector extension, securing the housing to the wall mount. Subsequent to a user coupling the housing to the mount, the environmental sensor may be in electrical communication with a power source, via at least one male ring connector being electrically coupled to its respective at least one female ring connector.

20 Claims, 11 Drawing Sheets

SYSTEM OF AND METHOD FOR MOUNTING AN ENVIRONMENTAL SENSOR TO AN ELEVATED SURFACE

BACKGROUND OF THE INVENTION

1. Field of the Invention

This invention relates, generally, to mounting equipment. More specifically, it relates to a system of and method for mounting an environmental sensor to an elevated surface.

2. Brief Description of the Prior Art

The mounting of equipment and devices (e.g., smoke detectors) onto elevated support surfaces (e.g., a ceiling, a post, or a wall) is dependent on the manufacturer's mounting locations on those structures for securing such equipment and devices. This may require individual adaptation for each piece of equipment or device to mount to these specific locations which may be time consuming and require significant touch labor. Furthermore, if the piece of equipment or device is desired to moved or required to be replaced, the amount of time and effort is increased to remove and remount the piece of equipment or device in a new location. The amount of effort to individually adapt the equipment and devices increases for mobile applications.

For smoke detectors and other electronic equipment disposed in areas that required substantially high elevation, such as a wall or a ceiling of a warehouse, to the task of servicing the electronic equipment entails significant difficulty. Moreover, warehouse safety requirements do not permit the use of a ladder to reach equipment positioned above a certain height. Therefore, a scissor lift, or a similar type of machinery, may be required to service electronic equipment installed at a high elevation. The cost associated with deployment of may exceed the cost of the electronic equipment being serviced. As such, it is imperative that electronic equipment, like smoke detectors, may be replaced, as rapidly and as safely as possible.

Therefore, what is needed is a safe, efficient, and readily replaceable installation apparatus for environment sensors which are mounted at elevated support surfaces. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for is now met by a novel and non-obvious invention disclosed and claimed herein. In an aspect, the present disclosure pertains to an installation harness for mounting an environmental sensor onto an elevated support surface. In an embodiment the installation harness may comprise a wall mount configured to be affixed to the elevated support surface, the wall mount having a casing and a socket disposed on at least a portion of the casing. In this embodiment, the casing may comprise at least one first aperture, such that the at least one first aperture may be configured to receive at least one first fastening mechanism. Additionally, at least one ring groove may be disposed within the socket. In this manner, the at least one ring groove may be configured to retain at least one female ring connector. Furthermore, in this embodiment, the at least one female ring connector may be in electrical communication with a power source.

Moreover, the installation harness may also comprise a housing configured to be temporarily affixed to the environmental sensor. As such, the housing may have a first body, a second body, and a connector extension that is disposed on the first body of the housing. In an embodiment, the connector extension may be configured to couple the wall mount through the socket thereof. In addition, at least one male ring connector may be disposed on at least a portion of the connector extension of the housing, such that the at least one male ring connector may be in electrical communication with the environmental sensor. Accordingly, the at least one male ring connector may be configured to become electrically coupled with the respective at least female ring connector when the connector extension of the housing is coupled with the socket of wall mount. In this manner, electrical current may be enabled to flow between the power source and the environmental sensor.

In some embodiments, the connector extension of the housing may be configured to couple to the wall mount by a coupling mechanism. Additionally, in these other embodiments the coupling mechanism may comprise a screw-threaded engagement, a single contact bayonet cap, a double contact bayonet cap, an Edison Screw, a lilliput Edison Screw, a miniature Edison Screw, a Candelabra Edison Screw, a giant Edison screw, a halogen adaptor, a male and female peg, and/or any coupling mechanism known in the art.

In some embodiments, the environmental sensor may also comprise an interconnect wire. In this manner, the at least one male ring connector and the respective at least one female ring connector may be configured to connect to the interconnect wire. Additionally, in these other embodiments, the environmental sensor may be configured to communicate with at least one alternative environmental sensor through the interconnect wire.

The elevated support surface may also comprise a wall, a post, or a ceiling. Accordingly, the elevated support surface may be configured parallel with respect to a ground surface. Furthermore, in some embodiments the at least one male ring connector and the respective at least one female ring connector may be configured to connect to a ground wire.

Moreover, in some embodiments, the installation harness may further comprise a spacer which may include a distal end and a proximal end separated by a first distance. The spacer may also be configured to be affixed to the wall mount, such that a bottom surface of the spacer may abut a distal end of the wall mount and a top surface of the spacer may abut the proximal end of the elevated surface. As such, the spacer may also comprise at least one wire opening disposed about the first distance. In this manner, at least one wire from the power source may be separated from at least one alternative wire from the power source and preventing crossing between the at least one wire and the at least one alternative wire of the power source. Accordingly, in these other embodiments, the power source may be allowed to be in continuous electrical communication with the environmental sensor.

Another aspect of the present disclosure pertains to a method for mounting an environmental sensor onto an elevated support surface using an installation harness. In an embodiment, the method may comprise the following steps, including but not limited to, first fastening the environmental sensor to the housing, via at least one first fastening mechanism. In this embodiment, the environmental sensor may be configured to be electrically coupled to at least one male ring connector disposed on at least a portion of a connector extension of the housing. The next step of the method may comprise, affixing the housing to a wall mount, such that the wall mount may be configured to be affixed to the elevated support surface, via at least one second fastening mechanism. Additionally, the wall mount may include a casing and a socket disposed on at least a portion of the casing. Moreover, the casing may also comprise at least one aperture, such that the at least one aperture may be configured to receive at least one first fastening mechanism. Furthermore, the connector extension of the housing may be configured to selectively couple to the socket of the wall mount. Accordingly, the final step of the method may comprise interconnecting the environmental sensor to a power source, via electrical coupling. In this embodiment, the wall mount may comprise at least one female ring connector disposed within at least one respective ring groove. The ring groove may be disposed in the socket, such that the at least one female ring connector may be in electrical communication with the power source. In addition, in this embodiment, the at least one male ring connector may be in electrical communication with the environmental sensor, such that when the housing is coupled to the wall mount, the at least one female ring connector and the respective at least one male ring connector may be electrically coupled with one another. As such, an electric current may be enabled to flow between the power source and the electrical device.

In some embodiments, the environmental sensor may comprise an interconnect wire, and, as such, the at least one male ring connector and the respective at least one female ring connector may be configured to connect to the interconnect wire. Accordingly, in these other embodiments, the method may further comprise the step of, communicating with at least one alternative environmental sensor via the interconnect wire.

Furthermore, in some embodiments, the method may further comprise the step of, affixing a spacer to the wall mount. The spacer may have a distal end and a proximal end which may be separated by a first distance. In addition, a bottom surface of the spacer may abut a distal end of the wall mount and a top surface of the spacer may abut the proximal end of the elevated surface, such that the spacer comprises at least one wire opening disposed about the first distance. In this manner, at least one wire at least one wire from the power source may be separated from at least one alternative wire from the power source. Accordingly, crossing between the at least one wire and the at least one alternative wire of the power source is prevented, allowing the power source to be in continuous electrical communication with the environmental sensor.

In some embodiments, the at least one first fastening mechanism and at least one second fastening mechanism may comprise a screw, a nail, a snap fastener, a rivet, a magnet, and/or any fastener known in the art.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting.

Definitions:

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the term "environmental sensor" refers to any sensor known in the art which may report single sensor values and/or multi-dimensional array values. As such, the environmental sensor may be a chemical sensor, a smoke sensor, a vapor sensor, a gaseous sensor, a heat sensor, a temperature sensor, a pH sensor, a motion sensor, a position sensor, an accelerometer, a gravity sensor, a gyroscope, a step detector and/or counter, a proximity sensor, a pressure sensor, a light sensor, an ultrasonic sensor, a magnetometer, a force sensor, a vibration sensor, a Piezo sensor, a fluid property sensor, an orientation sensor, a barometer, a humidity sensor, and/or a salinity sensor. For ease of reference, the exemplary embodiment, described herein, refers to a smoke sensor (e.g., a smoke detector), but this description should not be interpreted as exclusionary of other single value and/or multi-dimensional array value sensors.

As used herein, "about" means approximately or nearly and in the context of a numerical value or range set forth means ±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Figure 1:
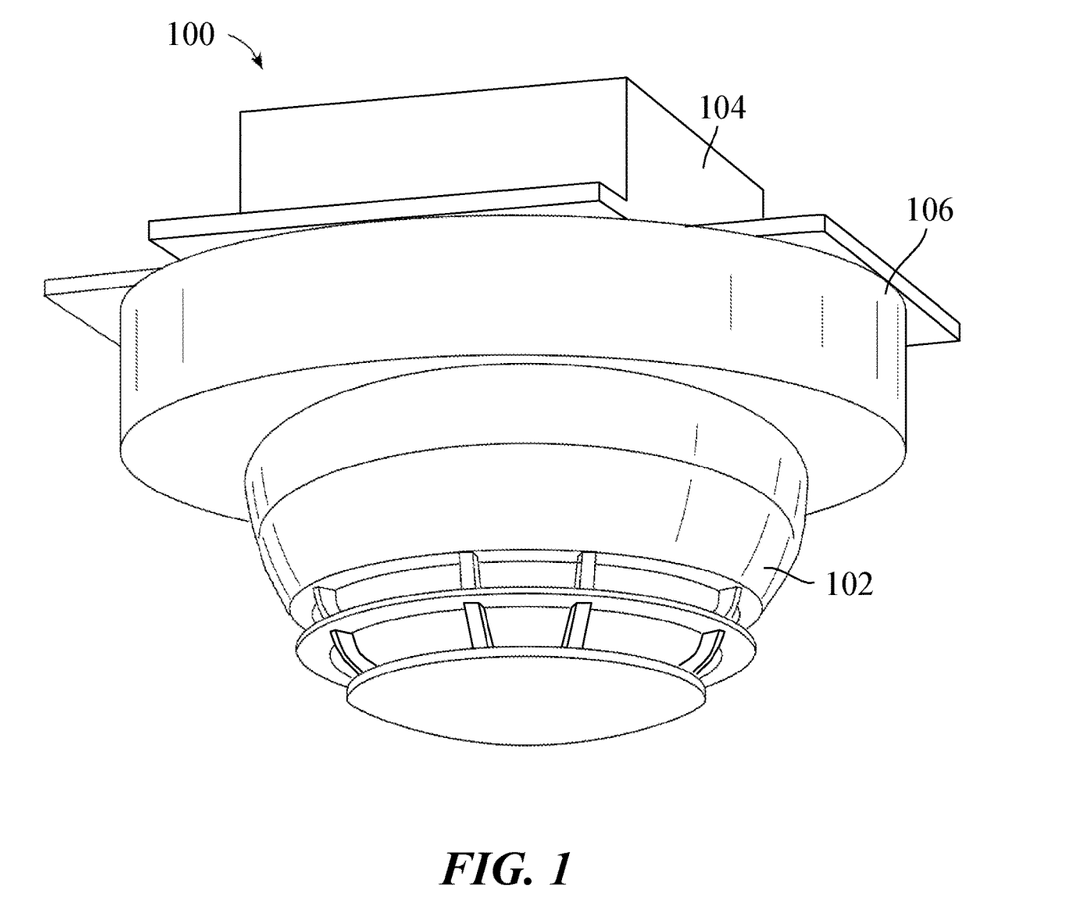
FIG. 1 is a perspective view of an environmental sensor affixed to an installation harness, according to an embodiment of the present disclosure.

Installation Harness:

The present disclosure pertains to an installation harness 100 to mount an environmental sensor 102 to an elevated support surface. In an embodiment, the environmental sensor may include a smoke detector, carbon monoxide detector, or any detector known in the art which detects potentially dangerous or poisonous gases, vapors, smoke, and/or fumes within an environment. Additionally, environmental sensor 102 may comprise a Wi-Fi or Bluetooth access point, in order to allow communication between environmental sensor 102 and at least one alternative electrical device. As shown in FIG. 1, installation harness 100 may include a housing 106 temporarily couple to a wall mount 104.

Figure 2:
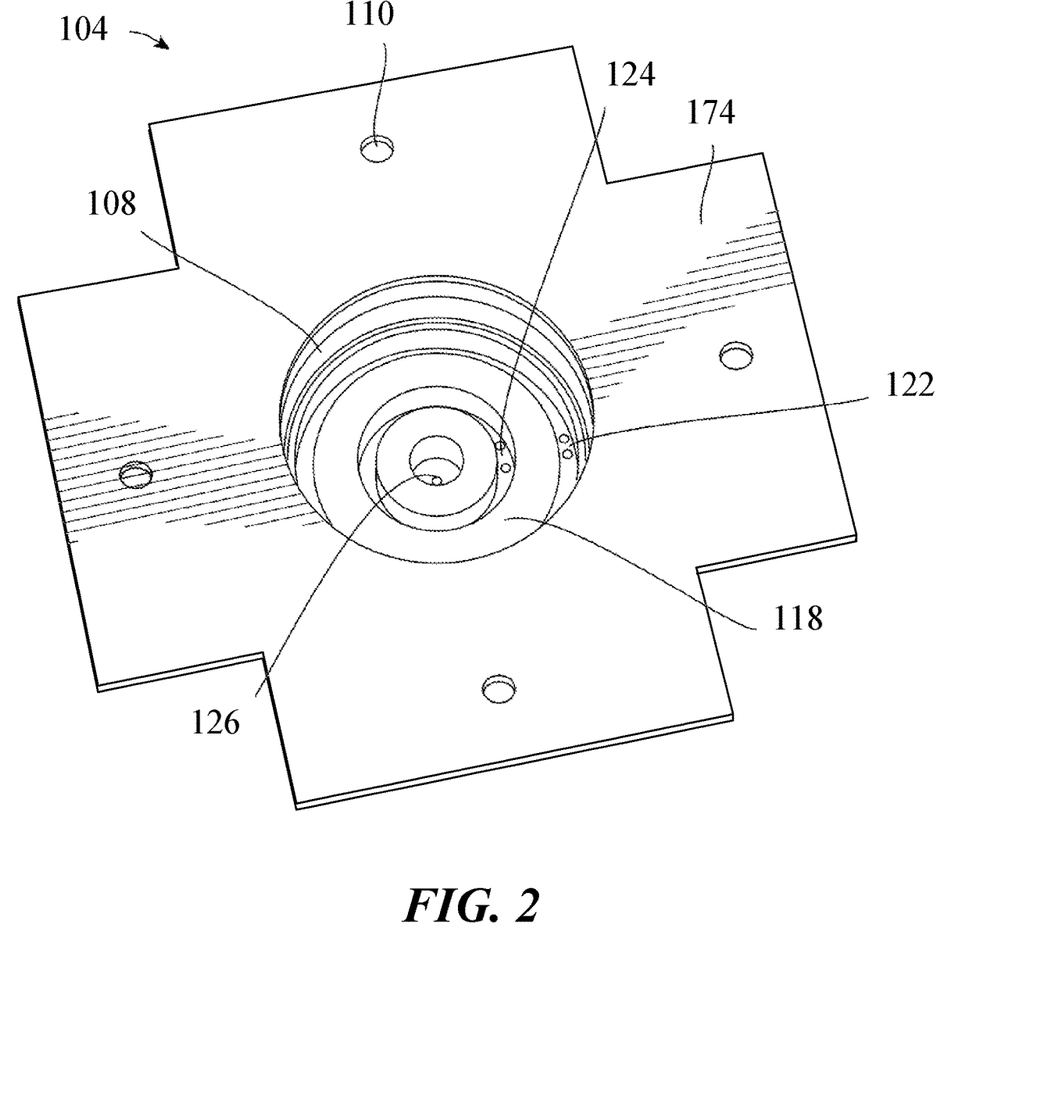
FIG. 2 is a perspective view of a wall mount, according to an embodiment of the present disclosure.
Figure 3:
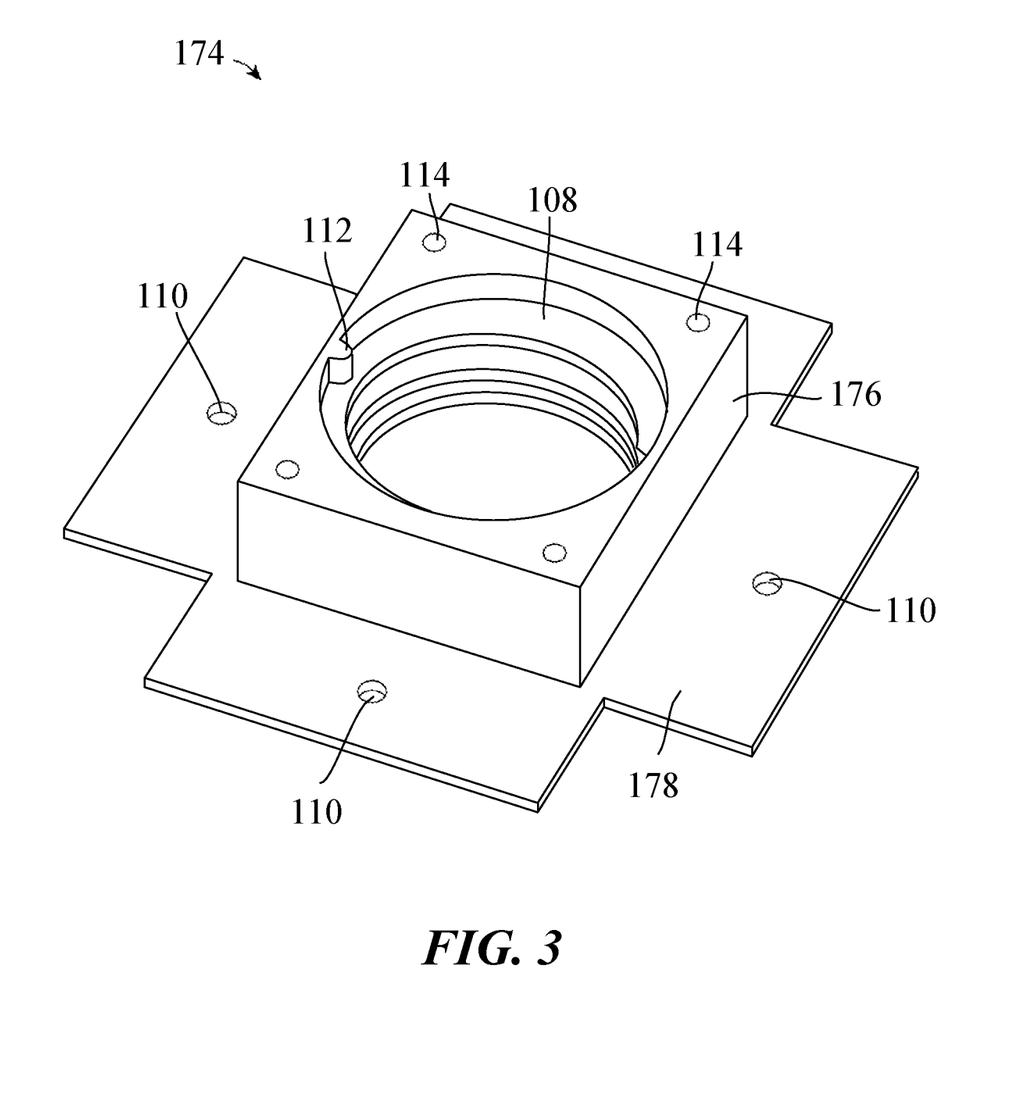
FIG. 3 is a perspective view of a casing of a wall mount, according to an embodiment of the present disclosure.

FIG. 2, in conjunction with FIG. 3, depicts wall mount 104, according to an embodiment of the present disclosure. In an embodiment, wall mount 104 may be configured to be affixed to an elevated support surface. As such, the elevated support surface may comprise a ceiling, a wall, and/or any elevated surface horizontal or vertical known in the art. In this embodiment wall mount 104 comprises a socket 118 and a casing 174. Accordingly, casing 174 may comprise at least one first aperture 110, extending between a top surface and a bottom surface, such that casing 174 may be temporarily coupled to the elevated surface. In addition, socket 118 may comprise a female coupling mechanism 108, which may temporarily couple housing 106 to wall mount 104. In this manner, female coupling mechanism 108 may be a female screw-threaded engagement, a female single contact bayonet cap, a female double contact bayonet cap, a female Edison Screw, a female lilliput Edison Screw, a female miniature Edison Screw, a female Candelabra Edison Screw, a female giant Edison screw, a female halogen adaptor, a female peg, and/or any female coupling engagement known in the art. As such, socket 118 may also comprise at least one female electric ring connector (122, 124, and 126), which allows a power source to be in electrical communication with environmental sensor 100, via housing 106. In some embodiments, casing 174 may be temporarily coupled to the elevated surface via a first fastening mechanism. In this manner, at least one first aperture 110 may be configured to receive the at least one first fastening mechanism. As such, the first fastening mechanism may be a screw, a nail, a snap fastener, a rivet, and/or any temporary connector or adhesive known in the art.

Moreover, as shown in FIG. 3, casing 174 may comprise an inner body 176 and an outer body 178, such that inner body 176 comprises socket 118 and female coupling mechanism 108. In an embodiment, outer body 178 may comprise at least one first aperture 110, which may be configured to temporarily couple to the elevated support surface. In this manner, outer body 178 may comprise a shape of a rectangle, a circle, a triangle, a square, an oval, a plus, and/or any shape known in the art which allows at least one first aperture to extend between the top surface and a bottom surface. Furthermore, as shown in FIG. 3, in conjunction with FIG. 5, inner body 176 may comprise a at least one second aperture 114, such that casing 176 may be configured to temporarily couple to a spacer 128. In some embodiments, as shown in FIG. 3, inner body 176 may comprise at least one projection 112, such that socket 118 may be configured to temporarily couple seamlessly with casing 174. In some embodiments, inner body 176 and socket 118 may be manufactured as one structure, such that socket 118 may be permanently coupled to casing 174.

Figure 4:
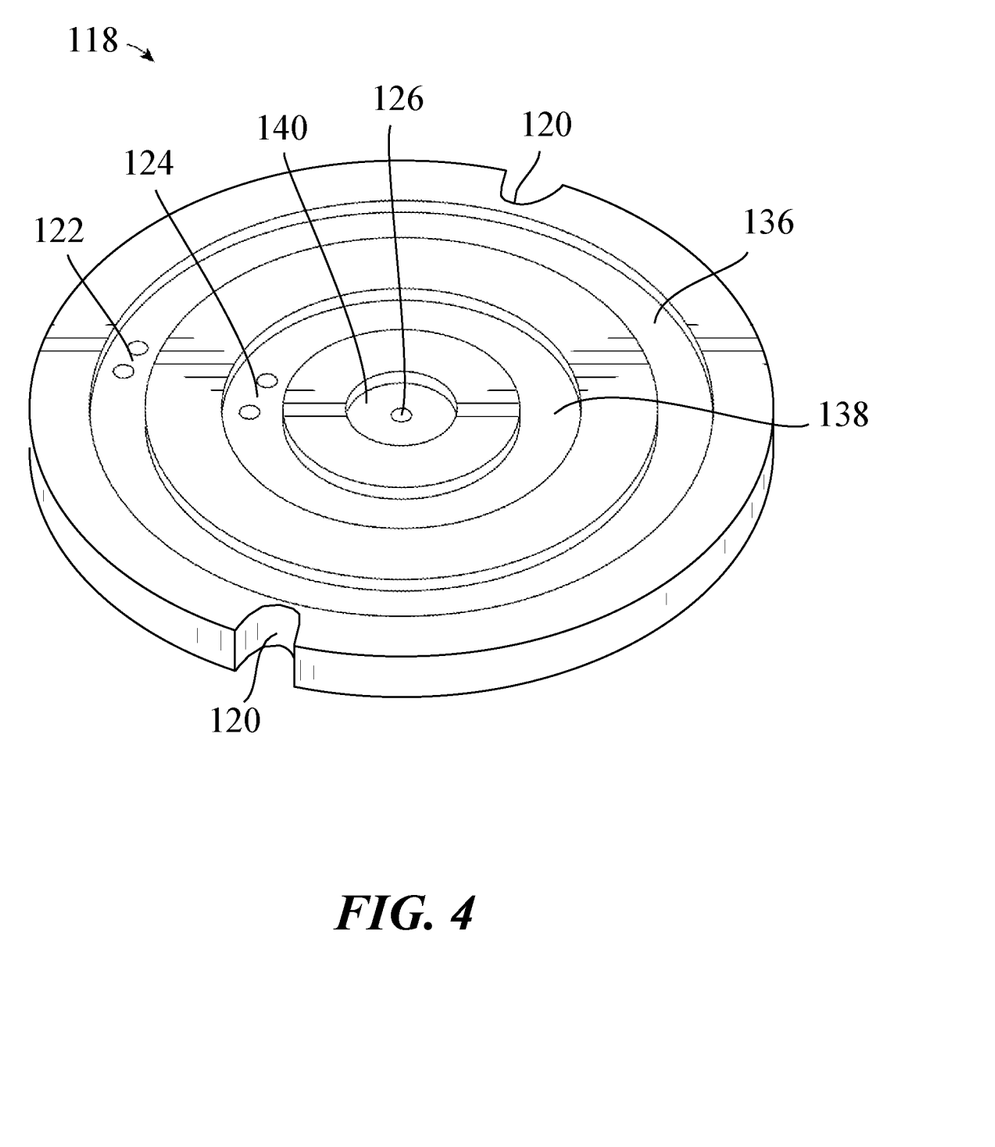
FIG. 4 is a perspective view of a socket of a wall mount, according to an embodiment of the present disclosure.

FIG. 4 depicts socket 118 of wall mount 104, according to an embodiment of the present disclosure. As shown in FIG. 4, in conjunction with FIGS. 2-3, socket 118 may comprise at least one female ring connector. In this embodiment, socket 118 may comprise at least three female electric ring connectors (e.g., a first 122, a second 124, and a third 126). As such, each female electric ring connector 122, 124, and 126, may have a corresponding groove (e.g., a first 136, a second 138, and a third 140), respectively, allowing a conductive substance to be disposed flush within the groove. In this manner, in this embodiment, as housing 106 is temporarily coupled to wall mount 104, housing 106 may be in continuous electrical communication, as each groove 136, 138, 140 contains a conductive substance, providing electrical current to housing 106 as a corresponding male connection mates with at least one of the female electric ring connectors. In some embodiments, the conductive substance may be copper, tin, and/or any conductive material known in the art.

In addition, as shown in FIG. 4, in conjunction with FIG. 3, in an embodiment socket 118 may comprise at least one opening 120, such that at least one opening 120 may encompass at least one projection 112 on casing 174. In this embodiment, socket 118 is disposed seamlessly within casing 174. Moreover, in some embodiments, at least one opening 120 may comprise an adhesive to temporarily encompass at least one projection 112 within at least one opening 120. As such, if at least one female electric ring connector 122, 124, and/or 126 no longer provides a complete circuit, and fails to provide electrical communication between the power source and environmental sensor 102, socket 118 may be removed and replaced with another socket 118. Additionally, in some alternative embodiments, at least one opening 120 may comprise an adhesive, such that at least one projection 112 is permanently encompassed within at least one opening 120.

Figure 5:
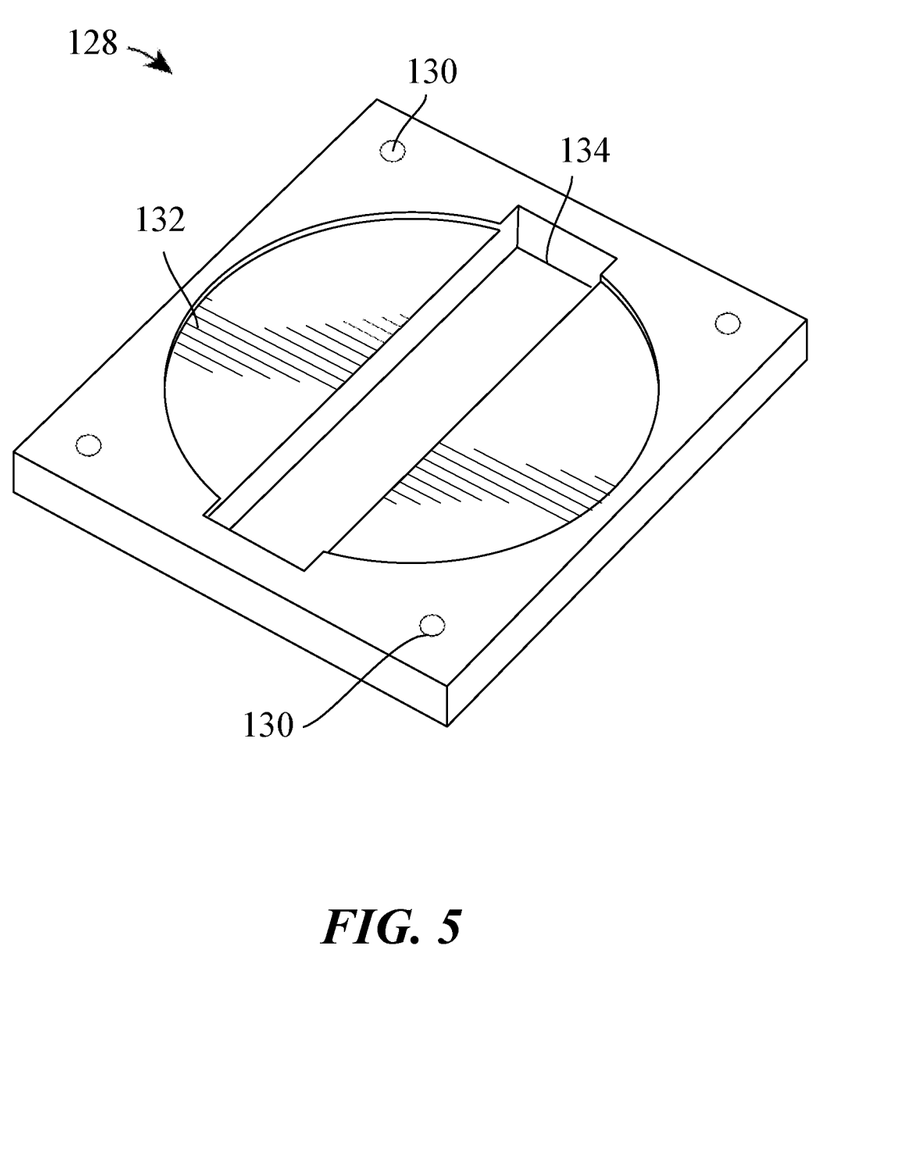
FIG. 5 is a perspective of a spacer of a wall mount, according to an embodiment of the present disclosure.

FIG. 5, in conjunction with FIGS. 2-3, depicts spacer 128 of wall mount 104, according to an embodiment of the present disclosure. In an embodiment, spacer 128 may be disposed about inner body 176 of casing 174. As such, in this embodiment at least one second aperture 114 may align with at least one third aperture 130. In this manner, spacer 128 may be temporarily coupled to casing 174, via at least one second aperture 114, via the at least one first fastening mechanism. At least one second aperture 114 may be configured to receive the at least one first fastening mechanism. Additionally, in an embodiment, spacer 128 may comprise a depression 132, such that socket 118 may be disposed within depression 132. Accordingly, spacer 128 may be disposed flush on a top surface of inner body 176 of casing 174. Furthermore, as shown in FIG. 5, in this embodiment, spacer 128 may have at least one wire opening 134, allowing the power source to connect with socket 118 of wall mount 104. In some embodiments, a distal end and a proximal end of spacer 128 may be separated by a first distance, such that at least one wire opening 134 may be disposed about the first distance. In some embodiments, spacer 128, casing 174, and socket 118 may be manufactured as one structure, such that spacer 128, casing 174, and socket 118 may be permanently coupled.

Figure 6:
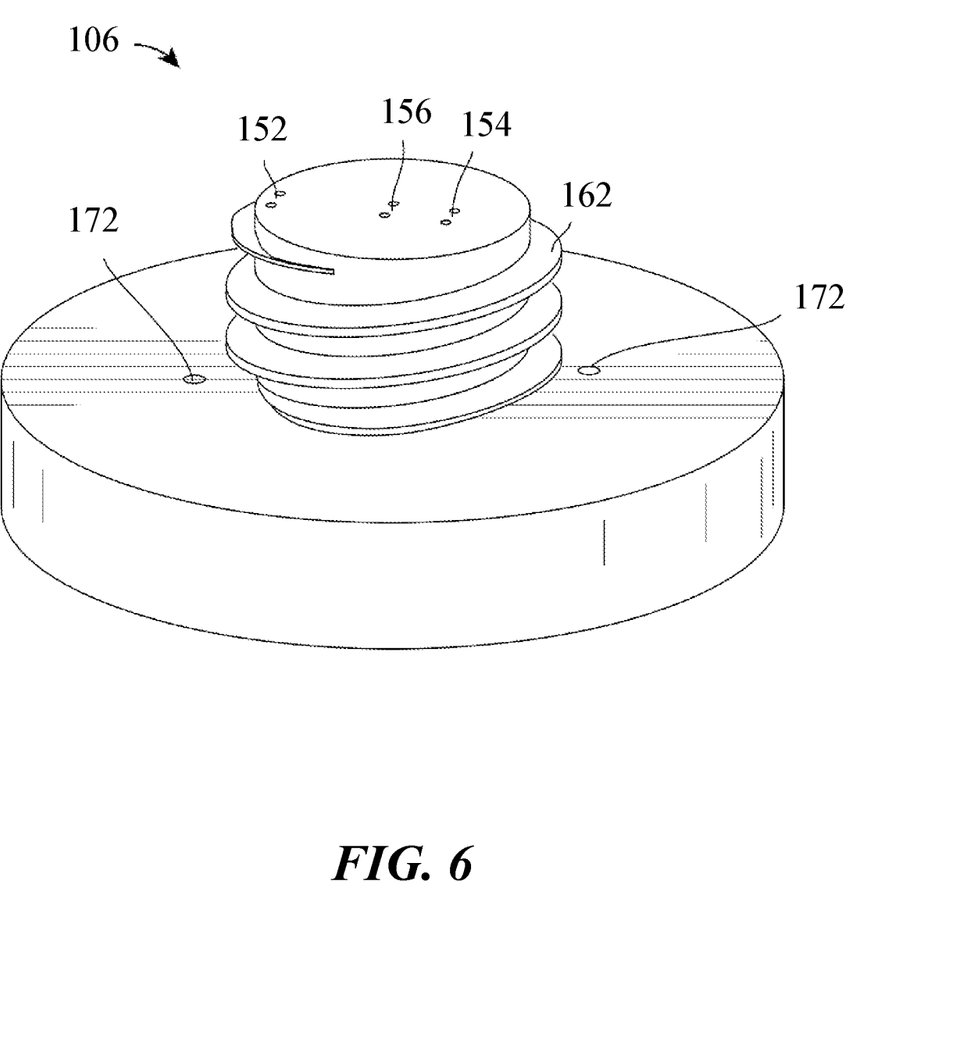
FIG. 6 is a perspective view of a housing, according to an embodiment of the present disclosure.
Figure 7:
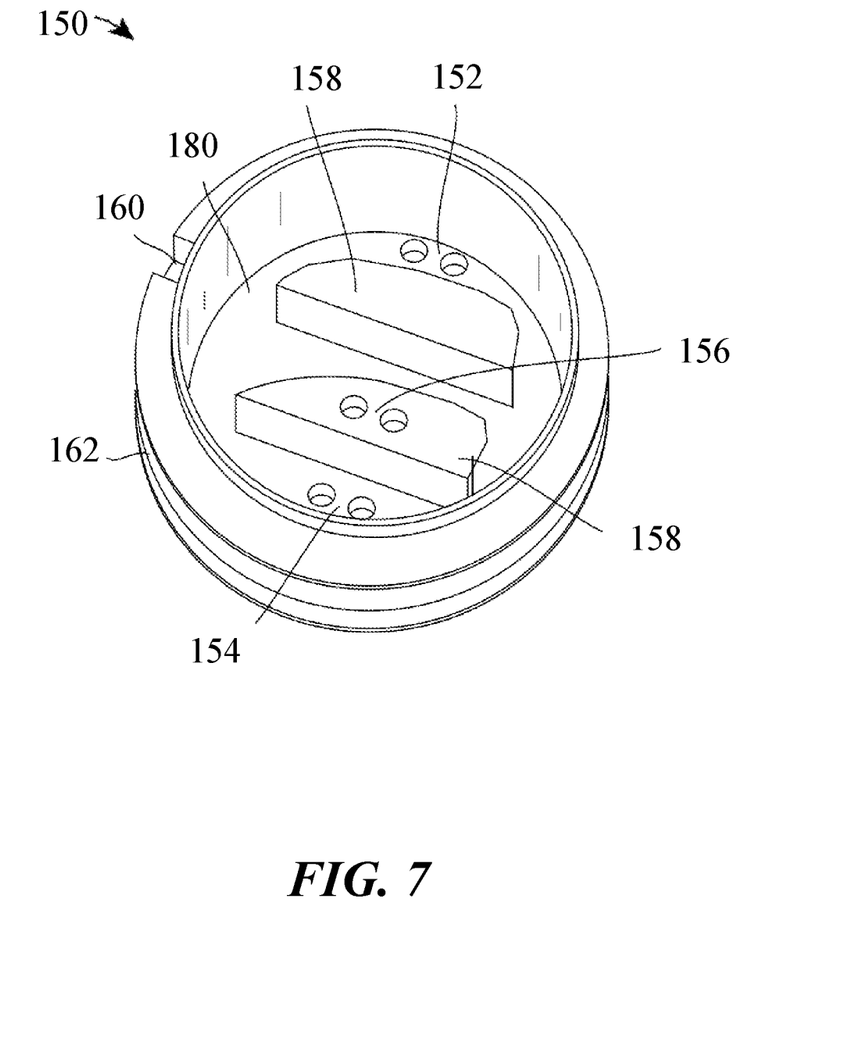
FIG. 7 is a perspective view of a connector extension of a housing, according to an embodiment of the present disclosure.

FIG. 6, in conjunction with FIG. 7, depicts a perspective view of housing 106, according to an embodiment of the present disclosure. In this embodiment, a connector extension 150 may be disposed about housing 106. As such, connector extension 150 may be configured to temporarily couple with socket 118. In this manner, in this embodiment connector extension 150 may comprise a male coupling mechanism 162 disposed on connector extension 150, which may be configured to align with female coupling mechanism 108 such that connector extension 150 and socket 118 may be temporarily coupled (e.g., Edison Screw). In this manner, male coupling mechanism 162 may be a male screw-threaded engagement, a male single contact bayonet cap, a male double contact bayonet cap, a male Edison Screw, a male lilliput Edison Screw, a male miniature Edison Screw, a male Candelabra Edison Screw, a male giant Edison screw, a male halogen adaptor, a male peg, and/or any male coupling engagement known in the art. Accordingly, in this embodiment, as shown in FIG. 1, in conjunction with FIGS. 6-10, male coupling mechanism 162 may be rotationally interconnected with female-screw-thread such that housing 106 and wall mount 104 may be temporarily affixed and abut each other. In other embodiments, housing 106 and wall mount 104 may be temporarily coupled via a snap fastener, rivet, and/or any temporary fastener known in the art.

In some embodiments, connector extension 150 may be temporarily coupled to socket 118 via a single contact bayonet cap, a double contact bayonet cap, a lilliput Edison Screw, a miniature Edison Screw, a Candelabra Edison Screw, a giant Edison screw, a halogen adaptor, at least one male and female peg, and/or any connector known in the art which may connect a fixture to socket 118. Furthermore, in an embodiment, connector extension 150 may comprise at least one male ring connector. As such, in this embodiment, connector extension 150 may comprise at least three male ring connectors (e.g., a first 152, a second 154, and a third 156), such that first 152, second 154, and third 156 may temporarily mate with the respective female ring connectors on wall mount 104 (e.g., first 122, second 124, and third 126, respectively).

Moreover, when wall mount 104 and housing 106 are temporarily coupled via connector extension 150 and socket 118, at least three male ring connectors 152, 154, and third 156 may be in electrical communication with at least three female ring connectors 122, 124, and 126, such that environmental sensor 102 may be in electrical communication with the power source. Furthermore, in some embodiments, at least one of the at least three male ring connectors 152, 154, and 156 and may configured to be a male positive terminal, a male negative terminal, and a male ground terminal, accordingly the at least three female ring connectors 122, 124, and 126 may be the respective female positive terminal, female negative terminal, and a female ground terminal.

In some embodiments, where environmental sensor 102 does not comprise a ground wire, only two of the at least three male connectors 152, 154, and 156 and only two of the at least three female connectors 122, 124, and 126 may be in electrical communication. Additionally, in these other embodiments, environmental sensor 102 may comprise an interconnecting wire. As such, at least one of the at least three male ring connectors 152, 154, and 156 and their respective at least three female ring connectors 122, 124, and 126 may comprise at least one male interconnecting terminal and female interconnecting terminal, respectively. In this manner, in these other embodiments, environmental sensor 102 may be in electrical and/or wireless communication with at least one alternative environmental sensor.

Accordingly, the interconnecting wire may comprise a DC current, and as such at least one of the at least three male ring connectors 152, 154, and 156 and their respective at least three female ring connectors 122, 124, and 126 may be configured to transfer direct current (hereinafter "DC"), respectively. Additionally, in some embodiments any of the at least one of the at least three male ring connectors 152, 154, and 156 and their respective at least three female ring connectors 122, 124, and 126 may be configured to transfer alternating current (hereinafter "AC"), DC, and/or any other electrical current known in the art which environmental sensor 102 may require.

Figure 8:
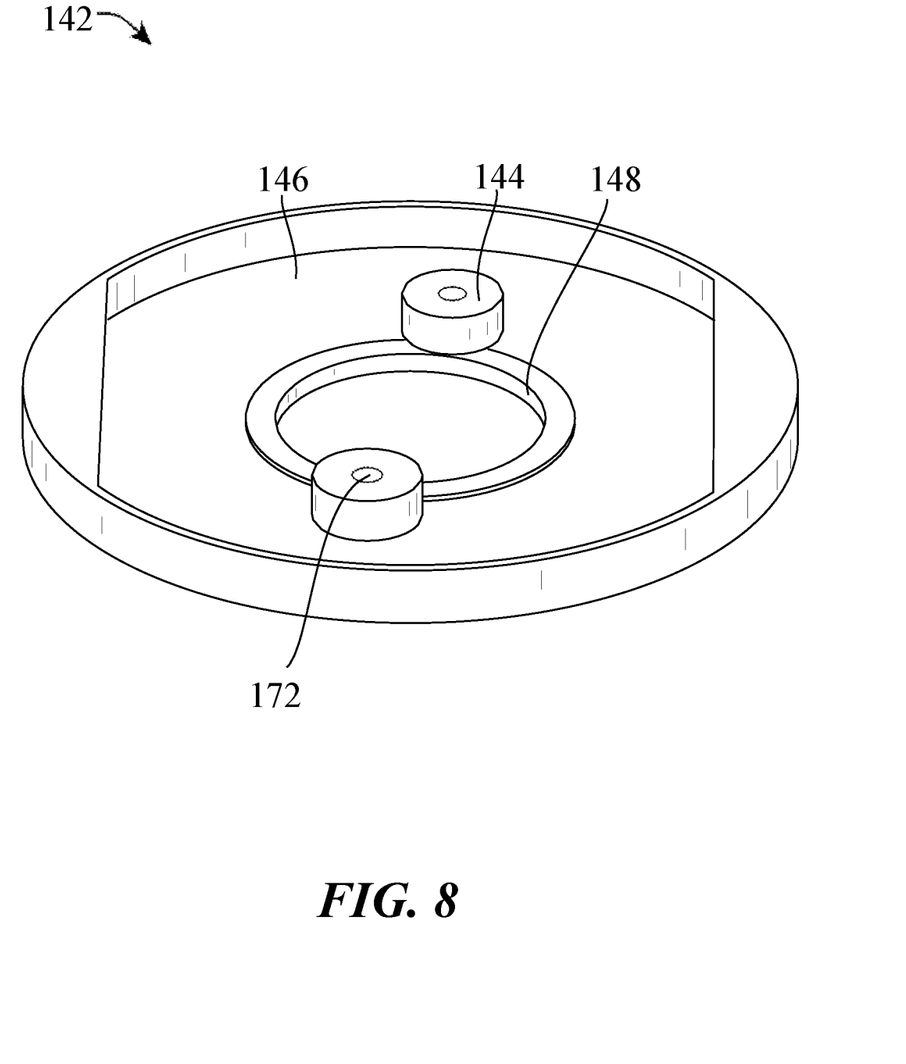
FIG. 8 is a perspective view of a first body of a housing, according to an embodiment of the present disclosure.
Figure 9:
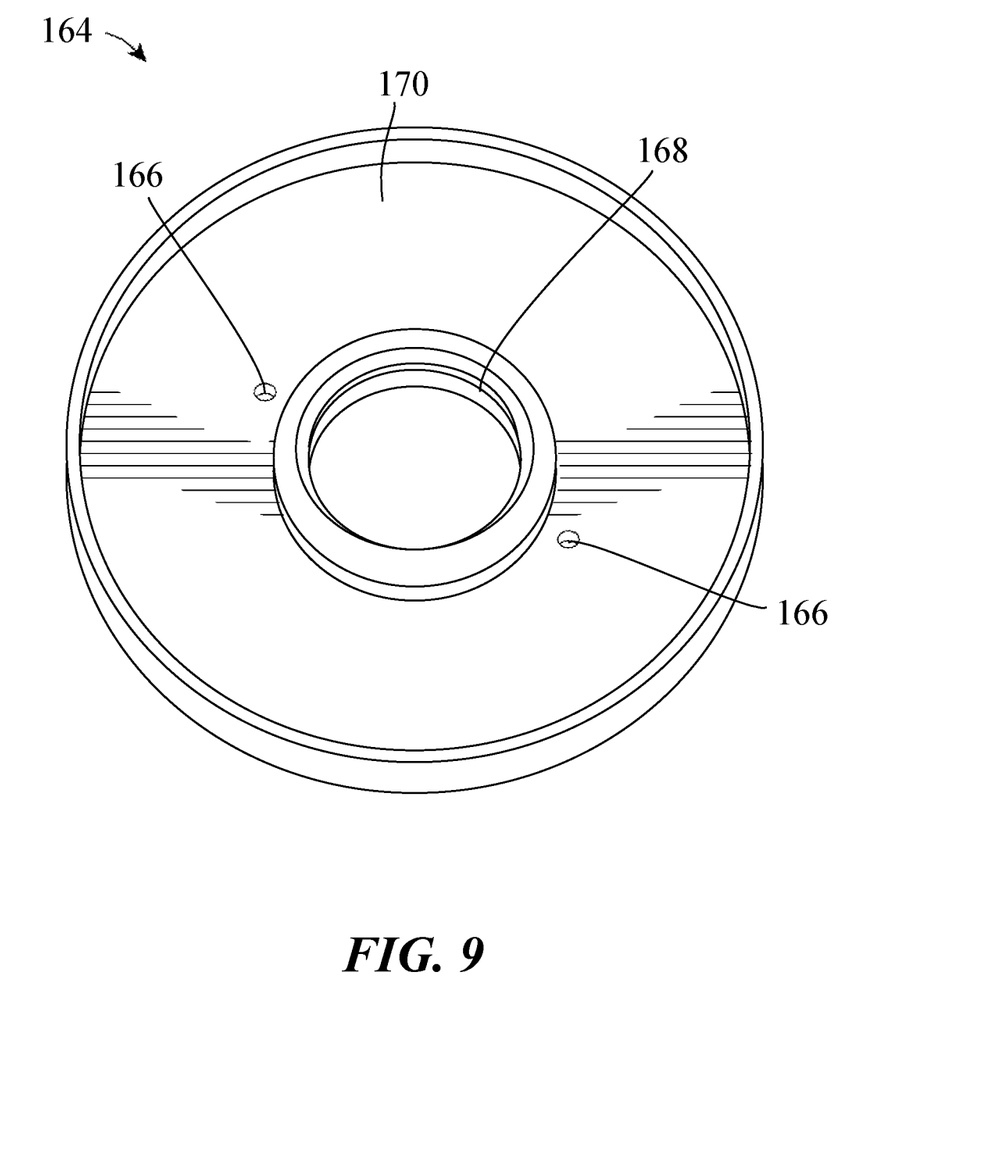
FIG. 9 is a perspective view of a second body of a housing, according to an embodiment of the present disclosure.
Figure 10:
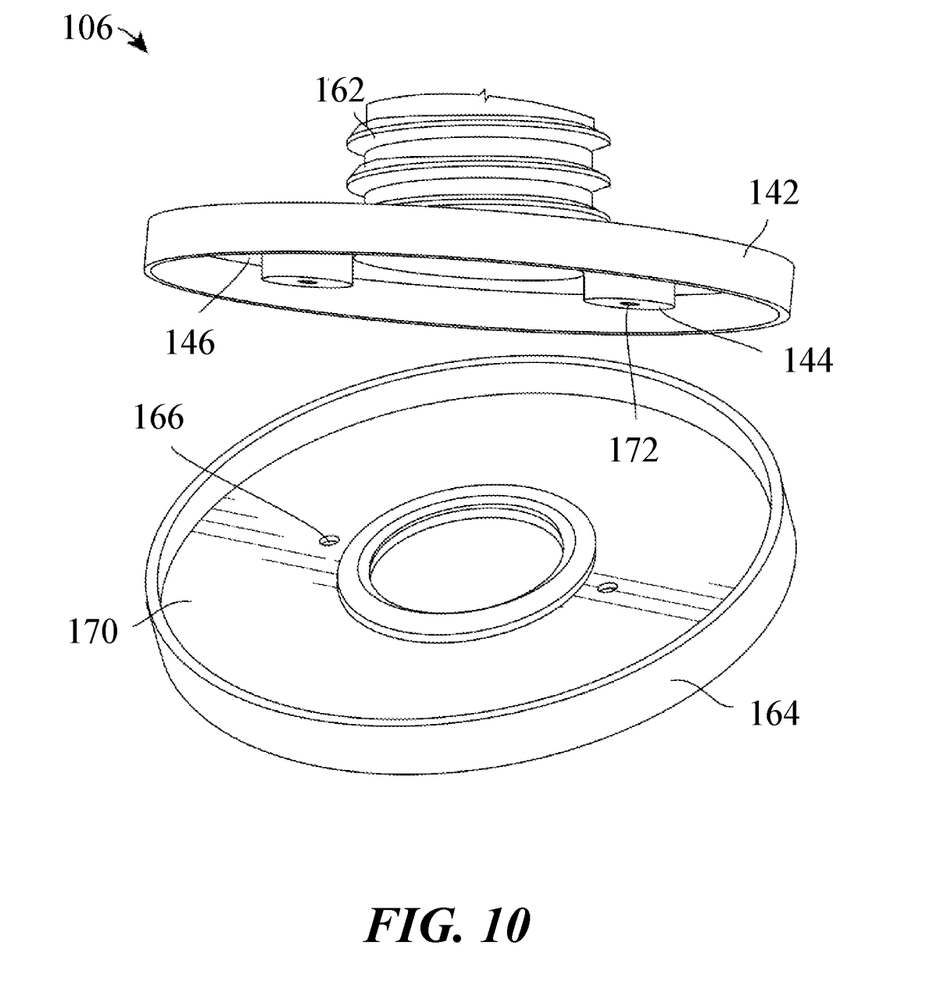
FIG. 10 is an exploded view of a housing, according to an embodiment of the present disclosure.

Furthermore, as shown in FIG. 6, in conjunction with FIGS. 8-10, housing 106 may comprise at least one fifth aperture 172, such that the at least one fifth aperture 172 may be extend between a first body 142 and a second body 164 of housing 106. In this manner, in this embodiment, at least one fifth aperture 172 may be configured to encompass a second fastening mechanism, allowing environmental sensor 102 to be temporarily affixed to housing 106. In this embodiment, the second fastening mechanism may be a nail, a screw, a rivet, and/or any temporary fastening structure or adhesive known in the art.

As shown in FIG. 7, in an embodiment, connector extension 150 may comprise a chamber 180, such that at least one of the at least three male ring connectors 152, 154, and 156 may be disposed within chamber 180. Accordingly, in this embodiment, at least one barrier 158 may be used to separate the at least three male ring connectors 152, 154, and 156. As such, at least one wire from the environmental sensor 102 may be prevented from crossing or interacting with at least one alternative wire, allowing continuous electric transfer and communication between the at least three male ring connectors 152, 154, and 156 and their respective female ring connector 122, 124, and 126 counterparts. Additionally, in some embodiments, connector extension 150 may comprise a sixth aperture 160, such environmental sensor 102 may be configured to attach to a router, ethernet, Bluetooth, and/or any network connection known in the art.

In addition, FIG. 8 depicts first body 142 of housing 106, according to an embodiment of the present disclosure. In an embodiment, first body 142 may comprise a first cavity 146, such that at least one wire from environmental sensor 102 may be disposed within first cavity 146. Accordingly, in some embodiments, at least one secondary power source (e.g., a battery) may be configured to be disposed within first cavity 146, such that environmental sensor 102 may continue to operate if environmental sensor 102 is temporarily prevented from being in electrical communication with the power source (e.g., power outage).

In this embodiment, as shown in FIG. 8, in conjunction with FIG. 10, first body 142 of housing 106, may further comprise at least one buffer 144, which may be configured to provide support between first body 142 and second body 164 of housing 106. At least one buffer 144 may prevent housing 106 from collapsing, such that at least one wire from environmental sensor 102 may be prevented from being cut, frayed, and/or damaged in any manner known in the art. In this manner, at least one fifth aperture 172 may be configured to extend between the top surface and the bottom surface of at least one buffer 144.

Accordingly, the second fastening mechanism may be configured to extend through at least one fifth aperture 172, such that environmental sensor 102 may be temporarily affixed to housing 106. Additionally, first body 142 may comprise a first entrance 148, such that connector extension 150 may be configured to temporarily affix to first body 142. In some embodiments, connector extension 150 may be permanently affixed to first entrance 148 of first body 142. First body 142 and connector extension 150 may be manufactured as one structure. Accordingly, at least one wire from environmental sensor 102 may be configured to extend through first entrance 148 and into chamber 180 of connector extension 150, where at least one wire may be in electrical communication with at least one of the at least three male ring connectors 152, 154, and 156.

As shown in FIG. 9, in conjunction with FIG. 8 and FIG. 10, in an embodiment, housing 106 may comprise a second body 164. In this embodiment, first body 142 may be configured to abut second body 164, allowing housing 106 to be seamless. In this manner, second body 164 may comprise at least sixth aperture 166. At least one sixth aperture 166 may be configured to align with at least one fifth aperture 172 of first body 143. Accordingly, in this embodiment, second fastening mechanism may be configured to extend through both fifth aperture 172 and sixth aperture 166, such that first body 142 and second body 164 may be temporarily affixed. Moreover, in an embodiment, second body 164 may comprise a second cavity 170. Like first cavity 146, second cavity 170 may be configured to encompass at least one wire of environmental sensor 102. As such, at least one wire of environmental sensor 102 may be entirely encompassed within housing 106, preventing exposure to outside elements (e.g., environment).

Furthermore, as shown in FIG. 10, in conjunction with FIGS. 8-9, second body 164 may also comprise a second entrance 168, such that at least one wire of environmental sensor 102 may entire housing 106, via second entrance 168 of second body 164. In some embodiments, second fastening mechanism may temporarily affix environmental sensor 102 to housing 106, via the at least one sixth aperture 166 and at least one fifth aperture 172, as fifth aperture 172 and sixth aperture 166 may be configured to receive at least one second fastening mechanism in order to align first body 142 with second body 164, respectively. Accordingly, in these other embodiments, second fastening mechanism may be configured to enter housing 106, via the at least one sixth aperture 166 first then, subsequently, extend through housing via the at least one fifth aperture 172. As such, in some embodiments, environmental sensor 102 may be configured to be affixed to an exterior surface of second body 164, such that at least one wire of environmental sensor 102 may enter second entrance 168 and subsequently, enter first entrance 148 where it may be in electrical communication with at least one of the three male ring connectors 152, 154, and 156.

Figure 11:
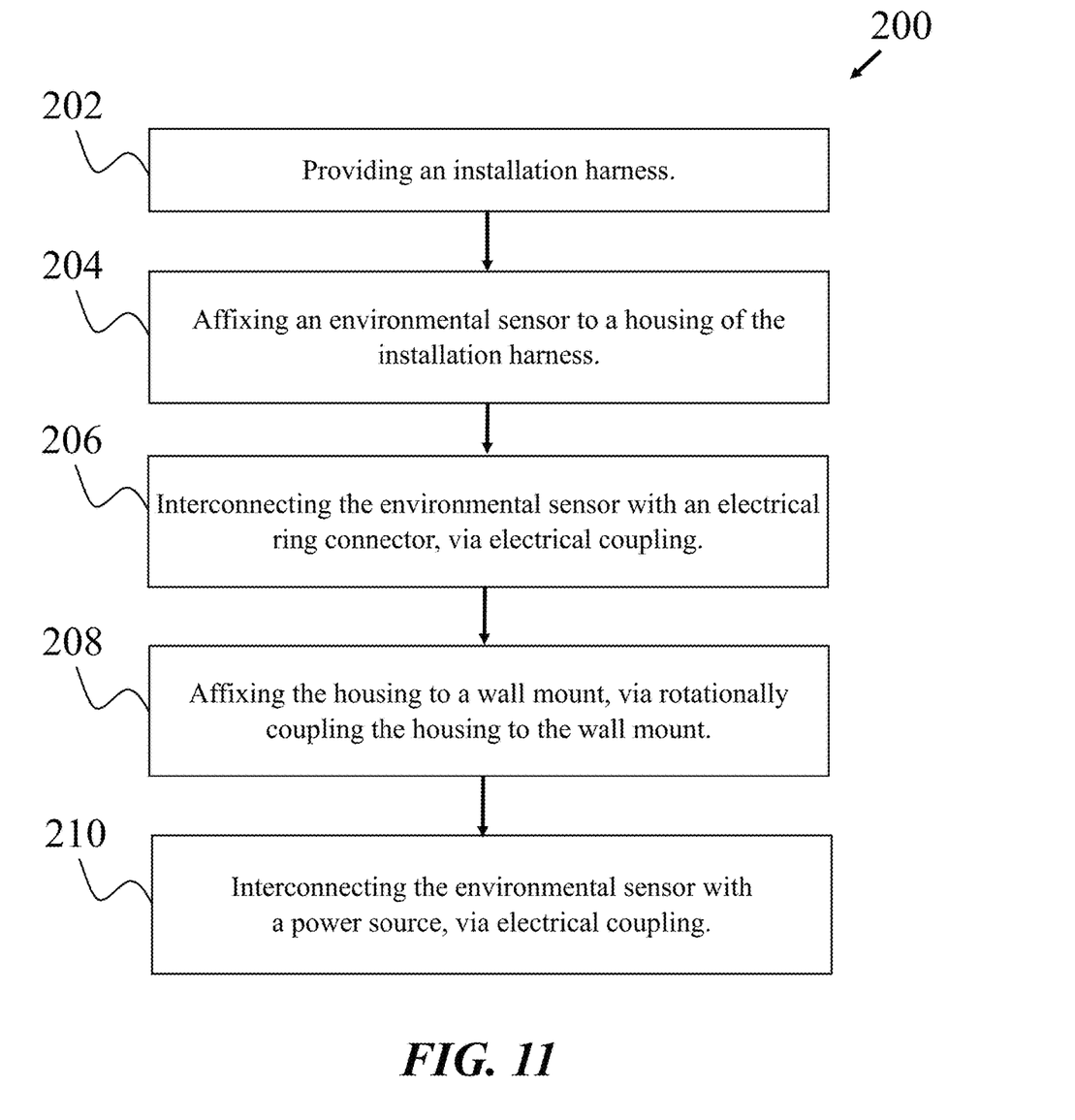
FIG. 11 is a flow chart depicting the steps of a method of mounting an environmental sensor to an elevated surface with an installation harness, according to an embodiment of the present disclosure.

Method of Use:

FIG. 11, in conjunction with FIGS. 1-10, depicts a flow chart providing the steps of a method 200 of mounting an environmental sensor 102 to an elevated surface with an installation harness, comprising a housing 106 and a wall mount 104. The steps delineated in FIG. 11 are merely exemplary of an order of mounting an environmental sensor 102 to an elevated surface. The steps may be carried out in another order, with or without additional steps included therein.

As shown in FIG. 11, in conjunction with FIGS. 1-10, in an embodiment, the method 200 begins at step 202, in which an installation harness comprising housing 106 and wall mount 104 is provided. The next step, step 204, comprises affixing an environmental sensor 102 to housing 106 of the installation harness. Additionally, in this embodiment, the environmental sensor 102 may be temporarily affixed to housing 106, via at least one second fastening mechanism configured to be received by at least one sixth aperture 166 and at least one fifth aperture 172. Subsequently, at step 206, environmental sensor 102 may be interconnected with at least one male electrical ring connector 152, 154, and 156, via electrical coupling. Furthermore, at step 208, housing 106 may be affixed to wall mount 104, via rotationally coupling housing 106 to wall mount 104, via male coupling mechanism 162 of connector extension 150 temporarily mating with female coupling mechanism 108 of wall mount 104. Finally, at step 210, environmental sensor 102 may be interconnected with a power source in electrical communication with wall mount 104, via electrical coupling.

All referenced publications are incorporated herein by reference in their entirety, to the same extent as if each were incorporated by reference individually. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An installation harness for mounting an environmental sensor onto an elevated support surface, comprising:
   a wall mount configured to be affixed to the elevated support surface, the wall mount having a casing and a socket disposed on at least a portion of the casing, wherein the casing comprises at least one first aperture, whereby the at least one first aperture is configured to receive at least one first fastening mechanism;
   at least one ring groove disposed in the socket, the at least one ring groove configured to retain at least one female ring connector, the at least one female ring connector being in electrical communication with a power source;
   a housing configured to be temporarily affixed to the environmental sensor, the housing having a first body, a second body, and a connector extension disposed on the first body of the housing whereby the connector extension is configured to couple the wall mount through the socket thereof; and
   at least one male ring connector disposed on at least a portion of the connector extension of the housing, wherein the at least one male ring connector is in electrical communication with the environmental sensor, and wherein the at least one male ring connector is configured to become electrically coupled with the at least female ring connector when the connector extension of the housing is coupled with the socket of wall mount, thereby enabling an electrical current to flow between the power source and the environmental sensor.

2. The installation harness of claim 1, wherein the connector extension of the housing is configured to couple to the wall mount by a coupling mechanism selected from a group consisting of a screw-threaded engagement, a single contact bayonet cap, a double contact bayonet cap, an Edison Screw, a lilliput Edison Screw, a miniature Edison Screw, a Candelabra Edison Screw, a giant Edison screw, a halogen adaptor, a male and female peg, and a combination of thereof.

3. The installation harness of claim 1, wherein the environmental sensor comprises an interconnect wire.

4. The installation harness of claim 1, wherein the elevated support surface is a wall, a post, or a ceiling.

5. The installation harness of claim 1, wherein the at least one male ring connector and the respective at least one female ring connector may be configured to connect to a ground wire.

6. The installation harness of claim 3, wherein the at least one male ring connector and the respective at least one female ring connector may be configured to connect to the interconnect wire.

7. The installation harness of claim 6, wherein the environmental sensor is configured to communicate with at least one alternative environmental sensor through the interconnect wire.

8. The installation harness of claim 1, wherein the elevated support surface is configured parallel with respect to a ground surface.

9. The installation harness of claim 1, further comprising a spacer having a distal end and a proximal end separated by a first distance, the spacer configured to be affixed to the wall mount, wherein a bottom surface of the spacer abuts a distal end of the wall mount and a top surface of the spacer abuts the proximal end of the elevated surface, whereby the spacer comprises at least one wire opening disposed about the first distance, thereby separating at least one wire from the power source from at least one alternative wire from the power source, preventing crossing between the at least one wire and the at least one alternative wire of the power source, and wherein the power source is allowed to be in continuous electrical communication with the environmental sensor.

10. A method for mounting an environmental sensor onto an elevated support surface using an installation harness, the method comprising:
    fastening the environmental sensor to the housing, via at least one first fastening mechanism, the environmental sensor being configured to be electrically coupled to at least one male ring connector disposed on at least a portion of a connector extension of the housing;
    affixing the housing to a wall mount, wherein the wall mount is configured to be affixed to the elevated support surface, via at least one second fastening mechanism, the wall mount having a casing and a socket disposed on at least a portion of the casing, whereby the casing comprises at least one aperture, the at least one aperture configure to receive at least one first fastening mechanism, and wherein the connector extension of the housing is configured to selectively couple to the socket of the wall mount; and
    interconnecting the environmental sensor to a power source, via electrical coupling, wherein the wall mount comprises at least one female ring connector disposed within at least one respective ring groove, the ring groove being disposed in the socket, wherein the at least one female ring connector is in electrical communication with the power source, and the at least one male ring connector is in electrical communication with the environmental sensor, whereby when the housing is coupled to the wall mount, the at least one female ring connector and the respective at least one male ring connector are electrically coupled with one another, thereby enabling an electrical current to flow between the power source and the electrical device.

11. The method of claim 10, wherein the connector extension of the housing is configured to couple to the wall mount by a coupling mechanism selected from a group consisting of a screw-threaded engagement, a single contact bayonet cap, a double contact bayonet cap, an Edison Screw, a lilliput Edison Screw, a miniature Edison Screw, a Candelabra Edison Screw, a giant Edison screw, a halogen adaptor, a male and female peg, and a combination of thereof.

12. The method of claim 10, wherein the environmental sensor comprises an interconnect wire.

13. The method of claim 10, wherein the elevated support surface is a wall, a post, or a ceiling.

14. The method of claim 10, wherein the at least one male ring connector and the respective at least one female ring connector is configured to connect to a ground wire.

15. The method of claim 13, wherein the at least one male ring connector and the respective at least one female ring connector is configured to connect to the interconnect wire.

16. The method of claim 15, further comprising the step of, communicating with at least one alternative environmental sensor via the interconnect wire.

17. The method of claim 10, wherein the elevated support surface is configured parallel with respect to a ground surface.

18. The method of claim 10, further comprising the step of, affixing a spacer to the wall mount, the spacer having a distal end and a proximal end separated by a first distance, wherein a bottom surface of the spacer abuts a distal end of the wall mount and a top surface of the spacer abuts the proximal end of the elevated surface, whereby the spacer comprises at least one wire opening disposed about the first distance, thereby separating at least one wire from the power source from at least one alternative wire from the power source, preventing crossing between the at least one wire and the at least one alternative wire of the power source, and wherein the power source is allowed to be in continuous electrical communication with the environmental sensor.

19. The method of claim 10, wherein the at least one first fastening mechanism is selected from the group consisting of a screw, a nail, a snap fastener, a rivet, a magnet, and a combination of thereof.

20. The method of claim 10, wherein the at least one second fastening mechanism is selected from the group consisting of a screw, a nail, a snap fastener, a rivet, a magnet, and a combination of thereof.

* * * * *